United States Patent
Subramaniam et al.

(10) Patent No.: US 9,141,780 B2
(45) Date of Patent: Sep. 22, 2015

(54) METHOD AND SYSTEM FOR AUTHENTICATING COMMUNICATION

(75) Inventors: Ramanathan Subramaniam, Old Bridge, NJ (US); Hooman Kashef Hamadani, Coto De Caza, CA (US)

(73) Assignee: SMSC HOLDINGS S.A.R.L., Hauppauge, NY (US)

( * ) Notice: Subject to any disclaimer, the term of this patent is extended or adjusted under 35 U.S.C. 154(b) by 9 days.

(21) Appl. No.: 13/301,809

(22) Filed: Nov. 22, 2011

(65) Prior Publication Data

US 2012/0304266 A1    Nov. 29, 2012

Related U.S. Application Data

(60) Provisional application No. 61/415,955, filed on Nov. 22, 2010.

(51) Int. Cl.
| | | |
|---|---|---|
| *G06F 7/04* | (2006.01) | |
| *G06F 15/16* | (2006.01) | |
| *G06F 17/30* | (2006.01) | |
| *H04L 29/06* | (2006.01) | |
| *G06F 21/33* | (2013.01) | |
| *G06F 21/44* | (2013.01) | |

(52) U.S. Cl.
    CPC .............. *G06F 21/33* (2013.01); *G06F 21/445* (2013.01); *G06F 2221/2103* (2013.01)

(58) Field of Classification Search
    CPC  G06F 21/33; G06F 21/445; G06F 2221/2103
    USPC .......................................................... 726/7
    See application file for complete search history.

(56) References Cited

U.S. PATENT DOCUMENTS

| 7,127,524 | B1* | 10/2006 | Renda et al. .................. 709/245 |
|---|---|---|---|
| 7,823,214 | B2* | 10/2010 | Rubinstein et al. ............. 726/34 |
| 8,208,853 | B2* | 6/2012 | Lydon et al. ................. 455/41.2 |
| 8,291,468 | B1* | 10/2012 | Chickering ....................... 726/1 |
| 2005/0091539 | A1* | 4/2005 | Wang et al. .................... 713/201 |
| 2006/0072527 | A1* | 4/2006 | Beck et al. .................... 370/338 |
| 2006/0185001 | A1* | 8/2006 | Stieglitz et al. .................. 726/4 |
| 2007/0186104 | A1* | 8/2007 | Suzuki .......................... 713/168 |
| 2007/0271387 | A1* | 11/2007 | Lydon et al. .................. 709/230 |
| 2007/0274525 | A1* | 11/2007 | Takata et al. .................. 380/270 |
| 2008/0172724 | A1* | 7/2008 | Esaka et al. ....................... 726/5 |
| 2008/0248835 | A1* | 10/2008 | Hansson et al. ............. 455/559 |
| 2008/0320190 | A1* | 12/2008 | Lydon et al. .................. 710/106 |
| 2009/0083834 | A1* | 3/2009 | Rubinstein et al. ............... 726/2 |

(Continued)

OTHER PUBLICATIONS

Stephan J. Engberg; Zero-knowledge Device Authentication:Privacy & Security Enhanced RFID preserving Business Value and Consumer Convenience; Citeseer; Year: 1998;pp. 1-13.*

*Primary Examiner* — Monjour Rahim
(74) *Attorney, Agent, or Firm* — Slayden Grubert Beard PLLC

(57) ABSTRACT

Embodiments of the present disclosure provide a method and system for authenticating communication between a plurality of accessory devices or services and one or more media devices by using a single authentication processor. The method includes the steps of establishing a communication of a media device attached to an accessory device with an authentication processor through an authentication processor manager, authenticating the accessory device by the media device based on a digital certificate and a digital signature; and authenticating the media device by the accessory device based on verification of the digital certificate and the digital signature.

20 Claims, 16 Drawing Sheets

(56) References Cited

U.S. PATENT DOCUMENTS

| | | | |
|---|---|---|---|
| 2010/0075604 A1* | 3/2010 | Lydon et al. | 455/41.3 |
| 2010/0173673 A1* | 7/2010 | Lydon | 455/557 |
| 2010/0235552 A1* | 9/2010 | Holden et al. | 710/72 |
| 2010/0241853 A1* | 9/2010 | Taylor | 713/168 |
| 2010/0333174 A1* | 12/2010 | Broerman et al. | 726/3 |
| 2011/0154043 A1* | 6/2011 | Lim et al. | 713/172 |
| 2011/0185171 A1* | 7/2011 | Karasawa et al. | 713/156 |
| 2011/0231901 A1* | 9/2011 | Nakamura et al. | 726/3 |
| 2012/0100832 A1* | 4/2012 | Mao et al. | 455/411 |
| 2012/0210124 A1* | 8/2012 | Lieber | 713/158 |

* cited by examiner

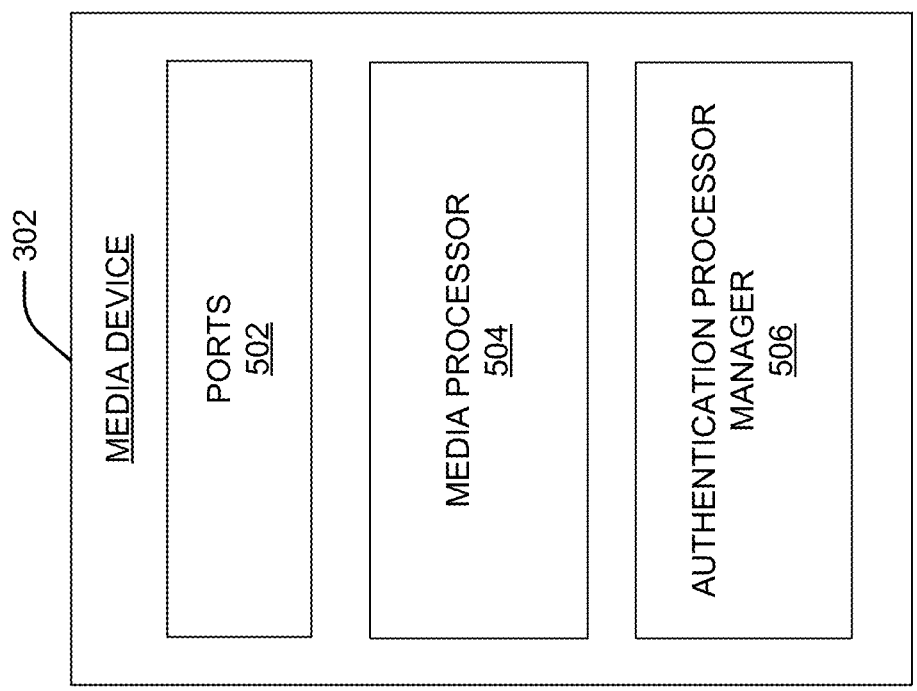

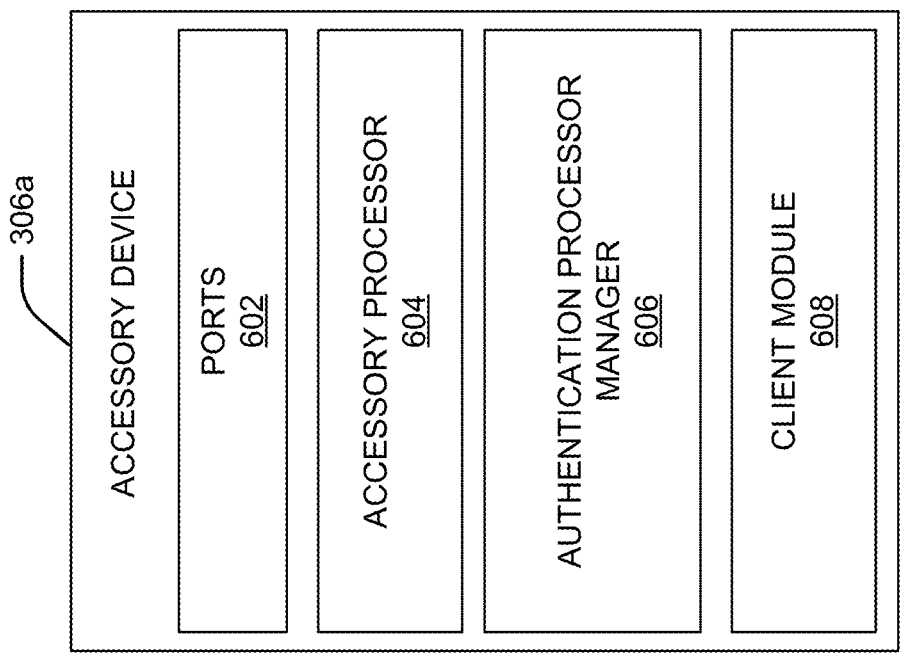

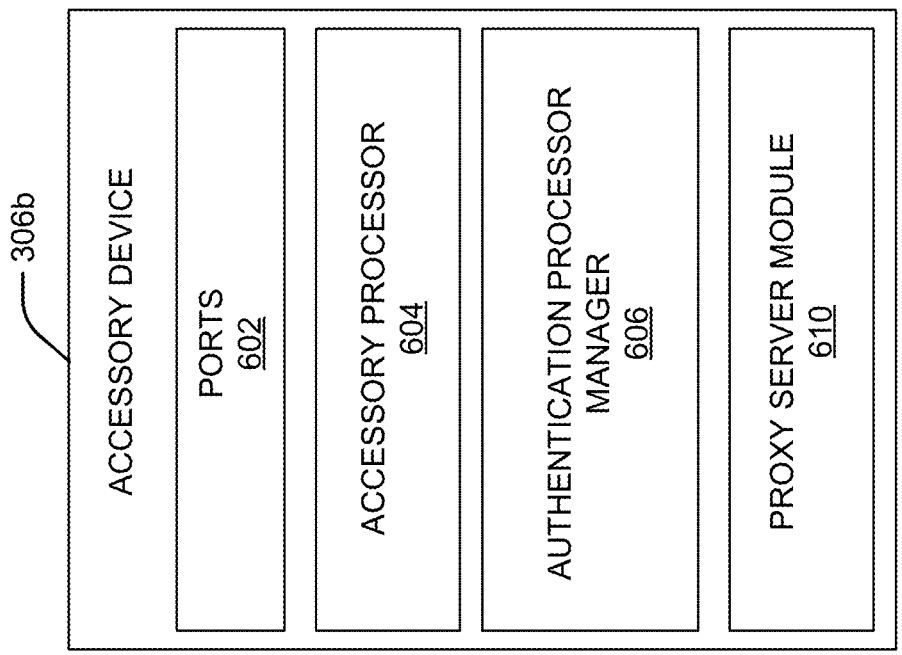

METHOD AND SYSTEM FOR AUTHENTICATING COMMUNICATION

CROSS-REFERENCE TO RELATED APPLICATIONS

This application claims the benefit of U.S. Provisional Patent Application No. 61/415,955, filed Nov. 22, 2010, which application is hereby incorporated by reference in its entirety.

TECHNICAL FIELD

The present disclosure relates to multimedia communication devices, and more specifically methods and systems that facilitate the use of accessory devices with multimedia devices.

BACKGROUND

A media device may store a plurality of media files, such as audio files, video files, photos, and so forth, which may be displayed or played at the media device. The media device can be an n iPod™, an iTouch™, an mp3 players, or similar device. The media device may include one or more ports or connectors for connecting to or interfacing with other devices. For example, a number of accessory devices such as a headset or speakers may be connected to the media device. Further, an accessory device can serve multiple types of media devices. For example, an accessory device may support playback of music streamed from iTunes™ over a network and may also support iPod™ docking The iPod™ may connect to the accessory device over a digital USB interface or an analog interface. Further, the accessory device and the media device may include multiple micro-controllers or processors. Each of the micro-controllers/processors may interface with different types of media devices or Apple products. For example, a micro controller may interface with an iPad™, another may connect with an iPhone™, and so forth. Therefore, the authentication of different types of media devices or services and the accessory devices becomes important for proper functioning of these devices.

The authentication processor may play an important role in the process of authentication between the media device(s) or a media service(s) and the accessory devices. For example, the Apple Authentication Co-Processor may authenticate an Apple device or an Apple service connected to one or more accessory devices and vice versa. Primarily, the authentication processor may perform two types of authentication i.e. authenticating both the media device and the accessory device.

Usually, the accessory device may use the authentication processor to authenticate the media device. One approach to facilitate the authentication process may require a dedicated Authentication Co-Processor for each processor or device responsible for interacting with a media device or Apple product. This approach may simplify the design and may provide for addition of new capabilities to an existing product. For example, an existing iPod™ docking product can be enhanced to support streaming audio from iTunes™ by adding a chipset that may support playback of audio streamed from an iTunes™ Media server and dedicating an Authentication Co-Processor to the iPod™ docking product. Though these techniques simplify the design and reduce time to market, but it adds significant cost due to the need to support multiple Authentication Co-Processor devices.

Therefore, there exists a need for a system and method to authenticate multiple interconnected devices by sharing a single authentication processor among multiple micro-processors in the devices.

SUMMARY

Briefly described, and according to one embodiment, the present disclosure describes a system and method for authenticating communication between a plurality of accessory devices or services and one or more media devices by using a single authentication processor. The method includes establishing a communication of a media device attached to an accessory device with an authentication processor through an authentication processor manager. Further, the method includes authenticating the accessory device by the media device based on a digital certificate and a digital signature. Furthermore, the method includes authenticating the media device by the accessory device based on verification of the digital certificate and the digital signature.

According to another embodiment, the present disclosure describes a system for authenticating communication between a plurality of accessory devices or services and one or more media devices. The system includes an authentication processor connected to the plurality of accessory devices and the one or more media devices for: supplying a digital certificate and a digital signature to the one or more media devices, authenticating an accessory device based on the digital certificate and the digital signature and authenticating the media device based on verification of the digital certificate and the digital signature. The system further includes an authentication processor manager for establishing and managing a communication of a media device attached to an accessory device with the authentication processor.

According to yet another embodiment, the present disclosure describes a system for providing communication of data among an authentication processor and a plurality of other processors. The system comprising a processor connected to the authentication processor. The system also comprises a proxy server module operating at the processor connected to the authentication processor connected through a hardware interface. The authentication processor provides services to a plurality of processors through the proxy server module. Further, the system includes a client executing at each of the plurality of processors for interacting with the proxy server module through a protocol for remotely accessing the services of the authentication processor.

BRIEF DESCRIPTION OF THE FIGURES

FIG. 5 is a block diagram illustrating structural components of a media device, in accordance with an embodiment of the present disclosure.

FIG. 6A is a block diagram illustrating structural components of an accessory device, in accordance with an embodiment of the present disclosure.

FIG. 6B is a block diagram illustrating structural components of an accessory device, in accordance with another embodiment of the present disclosure.

DETAILED DESCRIPTION

Overview

Embodiments of the present disclosure provide a method and system for communication between a number of accessory devices or services and media devices. The system includes a single authentication processor connected to the plurality of accessory devices and the media devices for authenticating the communication among these devices. A single authentication processor may provide one or more services such as authentication to multiple devices or processors. Each accessory device and media device may include processors. Further, these devices may be connected to a switch, which n turn may be connected to the authentication processor. Further, the accessory device or the media device may include an authentication processor manager. The media device may be attached to one or more accessory devices. Also, the authentication processor may supply digital certificates, such as an X.509 certificate to the media device(s), or it may verify the X.509 certificate provided by the media device. Further, the authentication processor may generate a challenge to the media device(s) or a digital signature based on the challenge received from the media device(s). Thereafter, the authentication processor may verify the digital signature provided by the media device. Hence, the authentication processor may authenticate the media device and the attached accessory device based on the verification of the digital certificate and the digital signature. The system also includes an authentication processor manager for establishing and managing a communication of a media device attached to an accessory device with the authentication processor.

In accordance with an embodiment of the present disclosure, the processor of the accessory device or the media device may include a client module for connecting to a proxy server executing at another accessory device. The another accessory device is directly connected to the authentication processor. The client module may communicate with the proxy server module for interacting with the authentication processor. The proxy server module may in turn communicate with the authentication processor. This way the client module may interact with the authentication processor and may use its services. Thereafter, the authentication processor may authenticate the media device and the accessory device executing the client module based on digital certificate and the digital signature.

Exemplary Prior Art Systems

Figure 1:
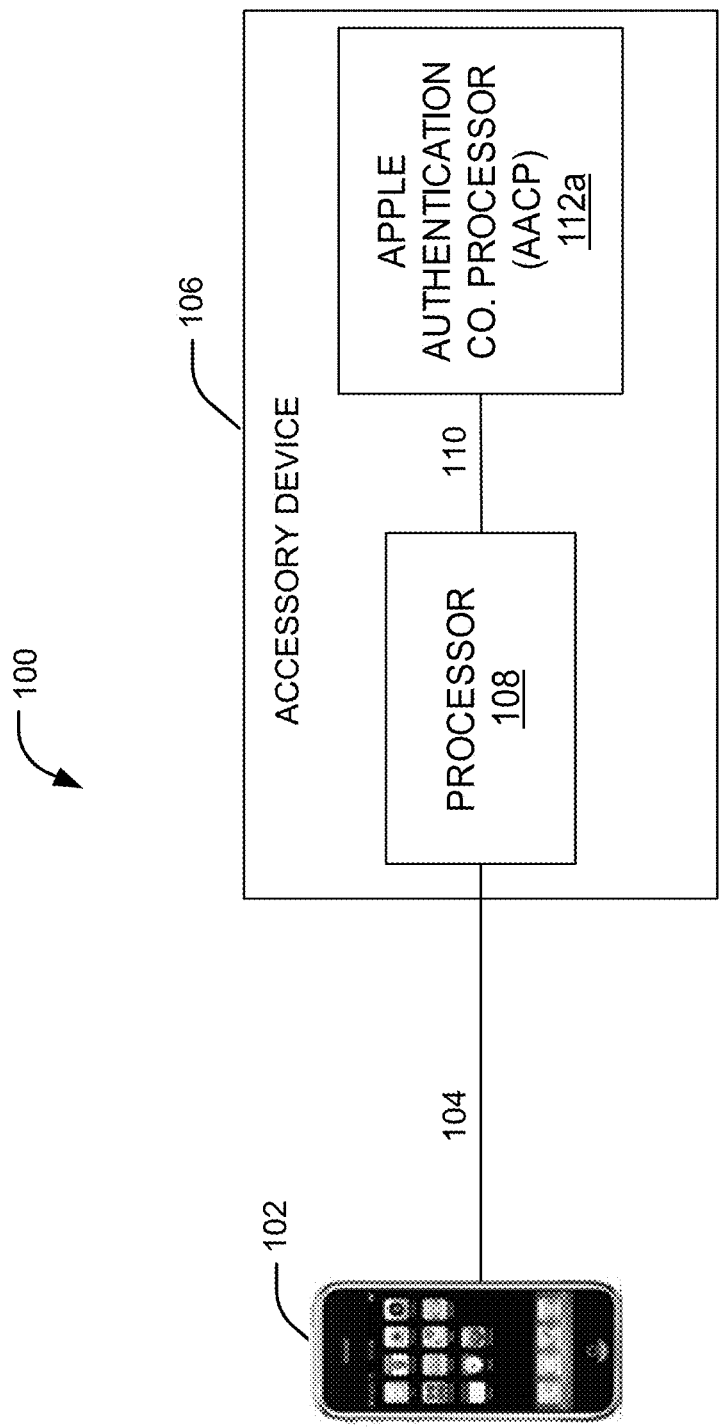
FIG. 1 illustrates a conventional system for authenticating an accessory device for docking a media device.

FIG. 1 illustrates a conventional system for authenticating an accessory device for docking a media device. The system 100 may include a media device such as an Apple device 102 including one or more multimedia files, and an accessory device 106. The media device 102 can be any device supporting multiple media files, such as an iPad™, an iTouch™, an iPhone™, a television, a laptop, a mobile phone, a music player, and so forth. The media device 102 may connect to multiple types of the accessory device 106 through an interface 104, which can be a universal serial bus (USB) or an analog interface. The accessory device 106 may include a processor 108 for communicating or attaching to a dedicated authentication processor 112a, such as an Apple authentication Co Processor (AACP) 112a. The processor 108 may connect to the AACP 112a via an interface 110 such as, but not limited to, a Serial Peripheral Interface (SPI), Inter Integrated Circuit (I2C) interface, and so forth.

Further, the processor 108 may include a software application for accessing the services of the AACP 112a such as authenticating the accessory device 106 by the Apple product or the media device 102 prior to the Apple device 102 exposing its capabilities to the accessory product. Further, the AACP 112a may check and verify that the media device 102 interfacing the accessory device 106 is a genuine device. The system 100 may require a separate authentication processor 112a for every processor 108 or the accessory device 106 and this may increase the cost of implementing the system 100.

Figure 2:
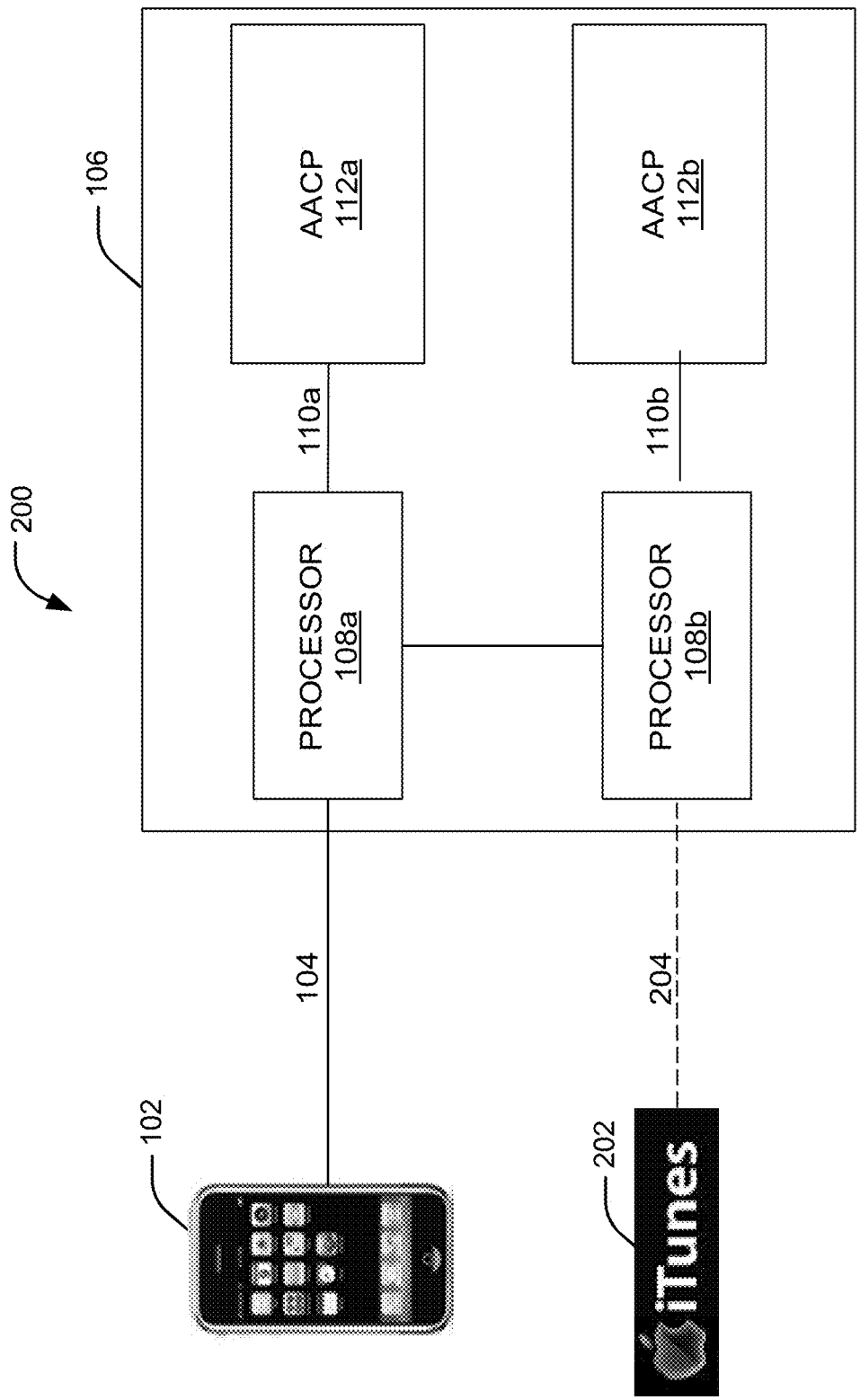
FIG. 2 illustrates another conventional technique for extending an existing accessory device attached to a media device to support new services.

FIG. 2 illustrates another conventional technique for extending an accessory device attached to a media device to support new services. As discussed with reference to FIG. 1, the media device 102 or an Apple product may connect to more than one type of the accessory device 106. Hereinafter, the media device 102 may be referred to as the Apple device 102 without changing its meaning. As shown in a system 200, the Apple device 102 may connect to multiple accessory devices 106 through a USB or Analog interface 104. However, the accessory device 106 may support multiple types of media device 102 (i.e. Apple device 102) and services such as a service 202. The service 202 can be an Apple service 202, or music playing applications such as iTunes™, gaming applications, utility applications, and so forth. Further, the service 202 may connect to the accessory device 106 or a processor 108b through a wireless connection 204 such as, a Wi-Fi, a ZigBee, a Radio Frequency 4 for Consumer Electronics (RF4CE), a Bluetooth, a Wireless Local Area Network (WLAN), and so forth. Separate processors may be used for interfacing with each of the Apple device 102 and the service 202.

Further, a dedicated authentication processor 112 is required for each processor 108 corresponding to different media devices i.e. the Apple device 102 and the service 202, for facilitating the authentication process. As shown the media device 102 may be attached to a processor 108a, which in turn is attached to an authentication processor 112a (or AACP 112a). Similarly, the service 202 may attach or communicate to the processor 108b, which in turn may communicate with an authentication processor 112b (or AACP 112b). Therefore, the media device 102 and the service 202 may use the one or more services of the AACP 112a and the AACP 112b respectively. Further, the AACP 112a will authenticate the communication or connection between the accessory device 106 and the Apple device 102. The AACP 112b may authenticate the communication or the connection between the accessory device 106 and the service 202. As in this system 200, a dedicated authentication processor or 112 is required for authenticating connection for each of the media device 102 or the service 202 connected to the accessory device 106. Though the system shows single media device 102 and a single service 202, a person skilled in the prior art will appreciate that the system 200 may include more than one service and media device. Further, for multiple media devices or services multiple AACP or the authentication processor is required and this may result in increase in the implementation cost. This may limit the implementation of the system 200. Therefore, to address the problems and limitations of existing arts, there is a need for a system or method for authenticating the communication by using or sharing a single authentication processor as described in FIG. 3 to FIG. 12.

Exemplary System

Figure 3:
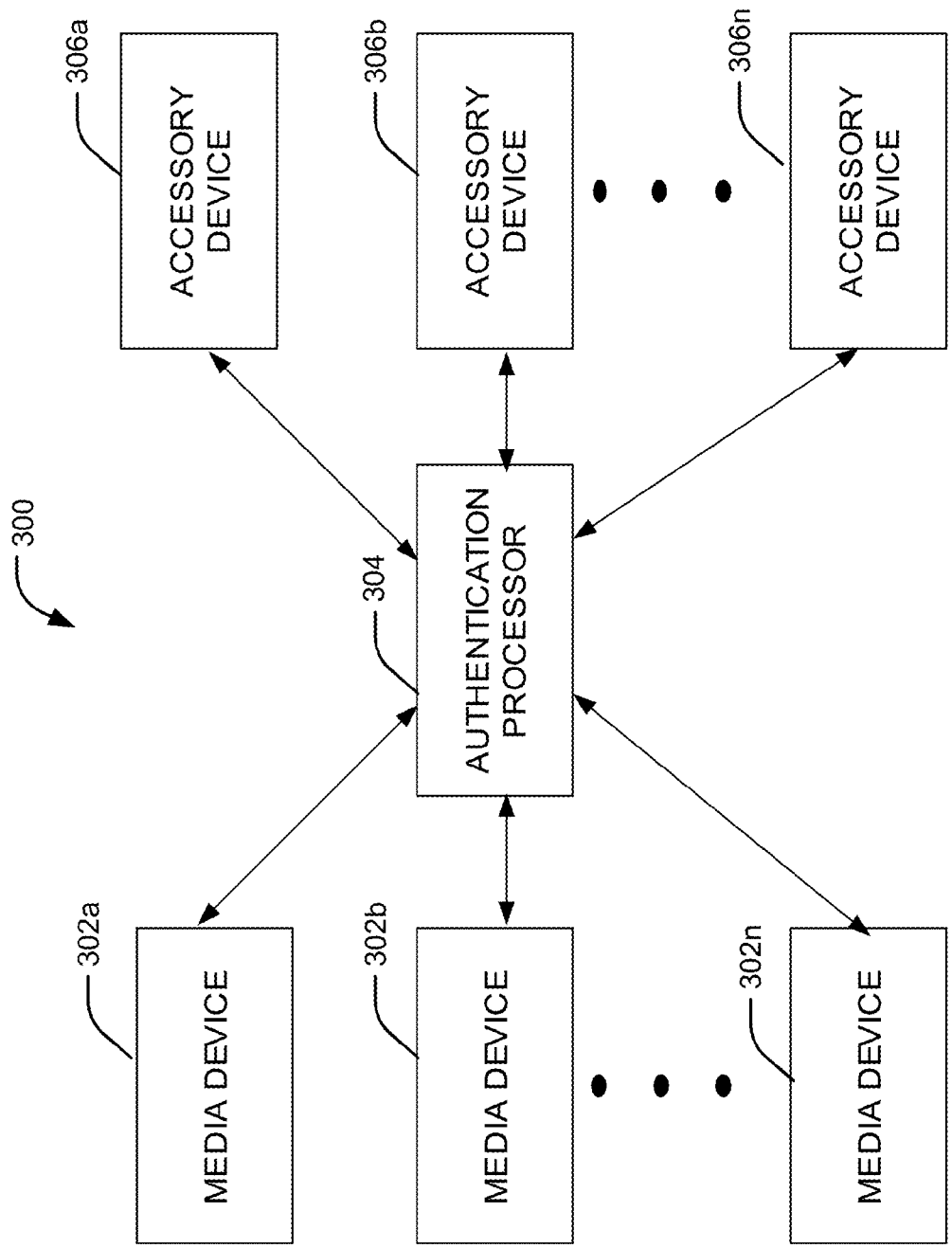
FIG. 3 illustrates an exemplary system where various embodiments of the present disclosure may function.

FIG. 3 illustrates an exemplary system 300 where various embodiments of the present disclosure may function. As shown the system 300 may include multiple media devices 302a-n, an authentication processor 304, and a number of accessory devices 306a-n. The media devices 302a-n can be mobile phones, music players such as, but not limited to, an iPod™, an iTouch™, and so forth, computers, laptops, telephones, televisions (TV), projectors, and so forth. Each of the media devices 302a-n may connect or attach to the one or more of the accessory devices 306a-n such as, hands free device, USB devices, Bluetooth devices, speakers, headsets, FM transmitters, audio/video accessories, and so forth. Further, the media devices 302a-n and the multiple accessory devices 306a-n may connect or interact with the authentication processor 304. A single authentication processor i.e. the authentication processor 304 may serve and provide one or more services, to all the attached devices i.e. the media devices 302a-n and the accessory devices 306a-n. The service can be an authentication of the communication between the media device and the accessory device. Therefore, the single authentication processor 304 may authenticate communication among different media devices 302a-n and the accessory devices 306a-n. Further, each of the media devices 302a-n and the number of accessory devices 306a-n may include a processor or a microcontroller unit for communicating with the authentication processor 304.

The authentication processor 304 may initiate an authentication of the media device 302 and the attached accessory device 306. The authentication processor 304 may supply a digital certificate such as an X.509 certificate to the one or more media devices 302a-n. The authentication processor 304 may also generate a challenge and send it to one or more of the media devices 302 a-n for public key verification. Further, the authentication processor 304 may generate a digital signature based on a challenge received from the media device 302. Also, the authentication processor 304 may authenticate the accessory devices 306a-n and the media devices 302a-n based on the digital certificate and the digital signature based on verification of the digital certificate and the digital signature. The authentication processor 304 may verify the X.509 certificate provided by the media device 302 and the digital signature provided by the media device 302 in response to the challenge sent to the media device 302.

Figure 4:
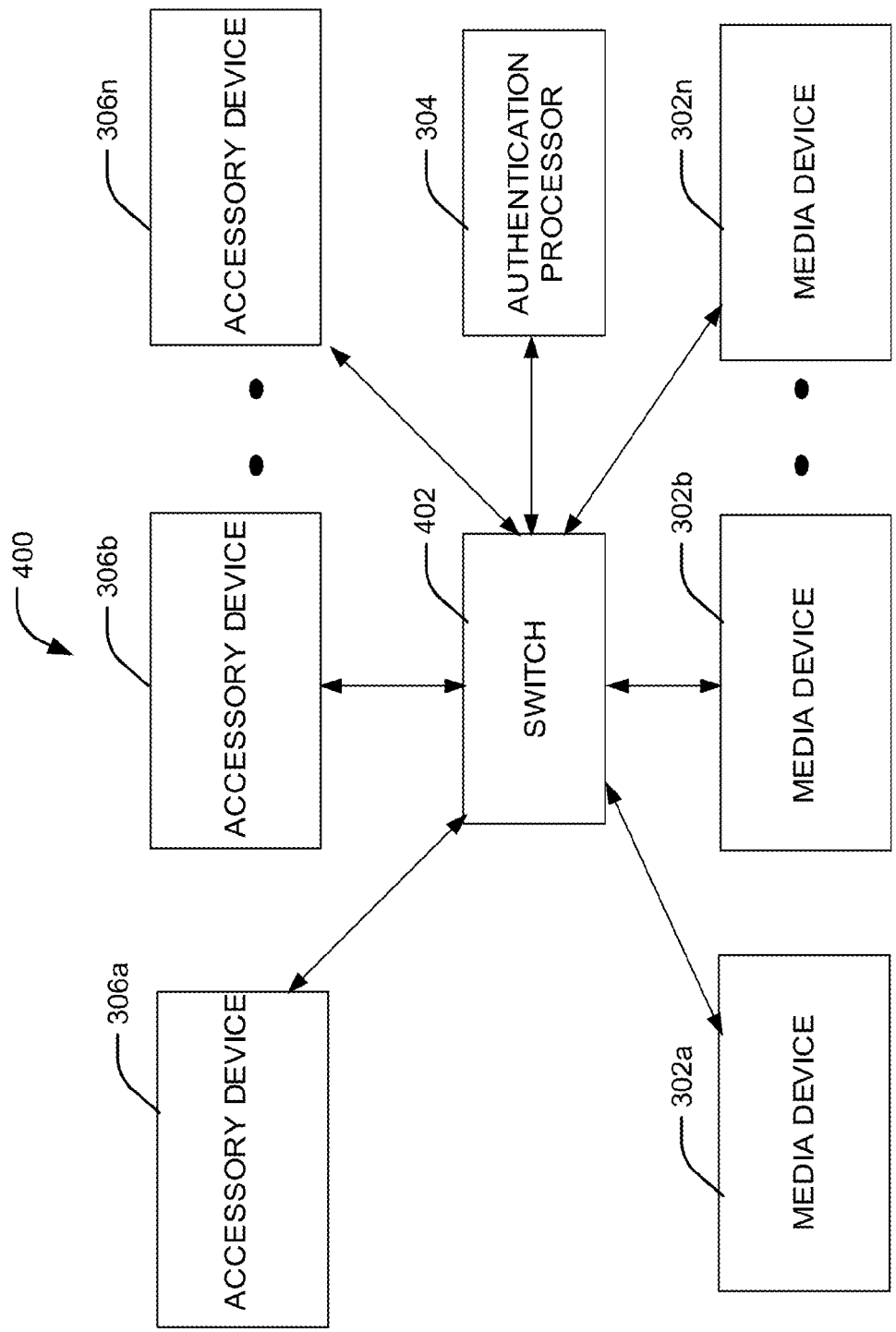
FIG. 4 illustrates another exemplary system where various embodiments of the present disclosure may function.

FIG. 4 illustrates another exemplary system 400 where various embodiments of the present disclosure may function. The system 400 shows a hardware based approach for sharing the single authentication processor 304 among various devices such as the media devices 302a-n and the accessory devices 306a-n or processors of these devices. The system 400 includes the media devices 302a-n and the accessory devices 306a-n connected to the single authentication processor 304 through a switch 402. The switch 402 can be a hardware device or bridge or hub which may mediate on interfaces among the authentication processor 304 and various devices.

Further, the switch 402 may be managed by at least one processor at one of the media devices 302a-n and the accessory devices 306a-n. Further, each of the media devices 302a-n and the accessory devices 306a-n may connect to the switch 402 through an I2C interface. Further, the switch 402 may associate the authentication processor 304 to the different devices i.e. the media devices 302a-n and the accessory devices 306a-n based on one or more requests. Further, a number of the media devices 302a-n or the accessory devices 306a-n may include an authentication processor manager for managing the communication between the authentication processor 304 and these devices. The switch 402 may also be managed by the authentication processor manager executing at a device of the number of the media devices 302 a-n and the accessory devices 306a-n. Also the switch 402 makes sure that only one device may communicate with the authentication processor 304 at a time. The authentication processor manager may receive requests from one or more processors of the devices for accessing one or more services of the authentication processor 304. The authentication processor 304 may be shared by the media devices 302a-n and the accessory devices 306a-n for authentication. Further, the authentication processor manager may configure the switch 402 to enable connectivity between requesting device or processor and the authentication processor 304 such that only one device may be communicate with the authentication processor 304 at a time. Thereafter, the requesting media device 302 may get control of the authentication processor 304 and may use one or more services. Further, the media device 302 may relinquish control of the authentication processor 304 after completing its work. Further, the authentication processor manager may reject a request when the authentication processor 304 is in use. Further, at a time, not more than one processor of a device (i.e. the media device 302 or the accessory device 306) can be associated with the authentication processor 304.

Further, the authentication processor 304 may supply a digital certificate such as an X.509 certificate to the media devices 302a-n for public key verification. Further, the authentication processor 304 may generate a challenge and send to the media devices 302a-n. Further, the authentication processor 304 may generate digital signature in response to a challenge received from a media device of the media device 302a-n. Moreover, the authentication processor 304 may verify the digital certificates and the digital signatures provided by the media devices 302a-n for authenticating the communication with the accessory devices 306a-n. The structure of the media device 302 is explained in detail in FIG. 5. Further, the structure of the accessory device 306 is explained in detail in FIG. 6A-6B.

Exemplary Media Device

FIG. 5 is a block diagram illustrating structural components of the media device 302, in accordance with an embodiment of the present disclosure. The media device 302 may include a number of ports 502, a media processor 504, and an authentication processor manager 506. In an embodiment of the present disclosure, the media device 302 may not include an authentication processor manager 506. In such a scenario, the media device 302 may communicate with the authentication processor 304 via an authentication processor manager 506 executing at other devices. The media device 302 may connect to the other devices such as the accessory device 306 or the switch 402 through the ports 502. Further, the ports 502 can be serial ports, USB ports, parallel ports, and so forth. The authentication processor manager 506 may establish and manage a communication of the media device 302 attached to the accessory device 306 with the authentication processor 304.

In an embodiment of the present disclosure, the media device 302 may include a client module for communicating with the authentication processor manager 506 or a proxy server module executing at other devices. The authentication processor manager 506 may receive request from the client module or the media device. The request may be for accessing services of the authentication processor 304. The authentication processor manager 506 may communicate with a proxy server module executing at a device such as the accessory device 306. The device having the proxy server module may directly interface with the authentication processor 304. The proxy server module may communicate with the authentication processor 304 based on the request from the client module. The authentication processor manager 506 may establish communication between the media device 302 and the authentication processor 304 through the client module and the proxy server module executing at different devices.

Exemplary Accessory Device

FIG. 6A is a block diagram illustrating structural components of the accessory device 306a, in accordance with an embodiment of the present disclosure. The accessory device 306a may include a number of ports 602, an accessory processor 604, an authentication processor manager 606, and a client module 608. In an embodiment of the present disclosure, the accessory device 306a may not include the client module 608. The accessory device 306a may connect to other devices such as the media device 302a-n, the switch 402, or the authentication processor 304 through these ports 602. The ports 602 can be serial ports, USB ports, parallel ports, and so forth. The authentication processor manager 606 may establish and manage a communication of the accessory device 306 with the authentication processor 304. In an embodiment of the present disclosure, the authentication processor manager 606 may receive requests from the media devices 302a-n for connecting to the authentication processor 304. The client module 608 executing on an accessory device such as the accessory device 302a or on another accessory device such as the accessory device 306b interfacing with a proxy server module may access the services provided by the authentication processor 304. Further, the client module 608 may communicate remotely with the proxy server module executing at another accessory device 306b.

FIG. 6B is a block diagram illustrating structural components of the accessory device 306b, in accordance with another embodiment of the present disclosure. The accessory device 306b may include multiple ports 602, the accessory processor 604, the authentication manager 606, and a proxy server module 610. The proxy server module 610 is executing or present at the accessory device 306b which may interface with the authentication processor 304 directly. The proxy server module 610 may communicate with the client module 608 executing at remote the accessory device 306a. The proxy server module 610 may function as a reverse proxy by hiding the details of the authentication processor 304 from the client module 608. Further, the accessory device 306a and the accessory device 306b may communicate with each other over an SPI interface and by using a remote authentication processor access protocol. Further, the proxy server module 610 may communicate with the authentication processor 304 by using an authentication processor access protocol. In an embodiment, the accessory device 306b may be connected to the authentication processor 304 through an I2C interface.

Exemplary Authentication Processor

Figure 7:
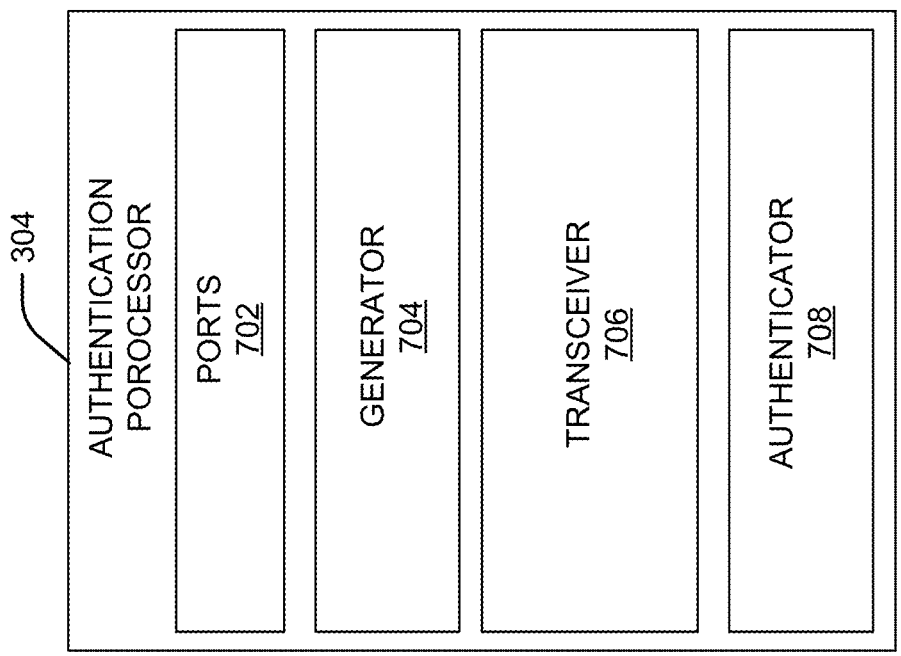
FIG. 7 is a block diagram illustrating an exemplary system where an authentication processor is connected to only one processor, in accordance with an embodiment of the present disclosure.

FIG. 7 is a block diagram illustrating structural components of the authentication processor 304, in accordance with an embodiment of the present disclosure. The authentication processor 304 may include a number of ports 702, a generator 704, a transceiver 706, and an authenticator 708. The authentication processor 304 may connect to other devices such as, media devices 302a-n, accessory devices 306a-n, the switch 402, and so forth through these ports 702. The generator 704 may generate a digital certificate such as an X.509 certificate for the media devices 302a-n for public key verification. Further, the generator 704 may generate challenges for each of the media devices 302a-n. The generator 704 may also generate a digital signature in response to the challenge(s) received from the media devices 302a-n. The digital signature may be used by the authentication server 304 for authenticating the accessory device 306a-n.

The transceiver 706 may send and receive the digital certificate(s) or digital signature(s) to or from the media devices 302a-n or the accessory devices 306a-n. Further, the transceiver 706 may send or receive the challenges to or from the media devices 302a-n or the accessory devices 306a-n. The authenticator 708 may verify the digital certificate i.e. the X.509 certificate received from the media devices 302a-n to facilitate authentication of the communication of the media devices 302a-n with the number of the accessory devices 306a-n. The authenticator 708 may further verify the digital signatures provided by the media devices 302a-n in response to the challenge sent to the media device 302a-n and may authenticate the communication between the media devices 302a-n and the accessory devices 306a-n.

Exemplary Implementations

Figure 8:
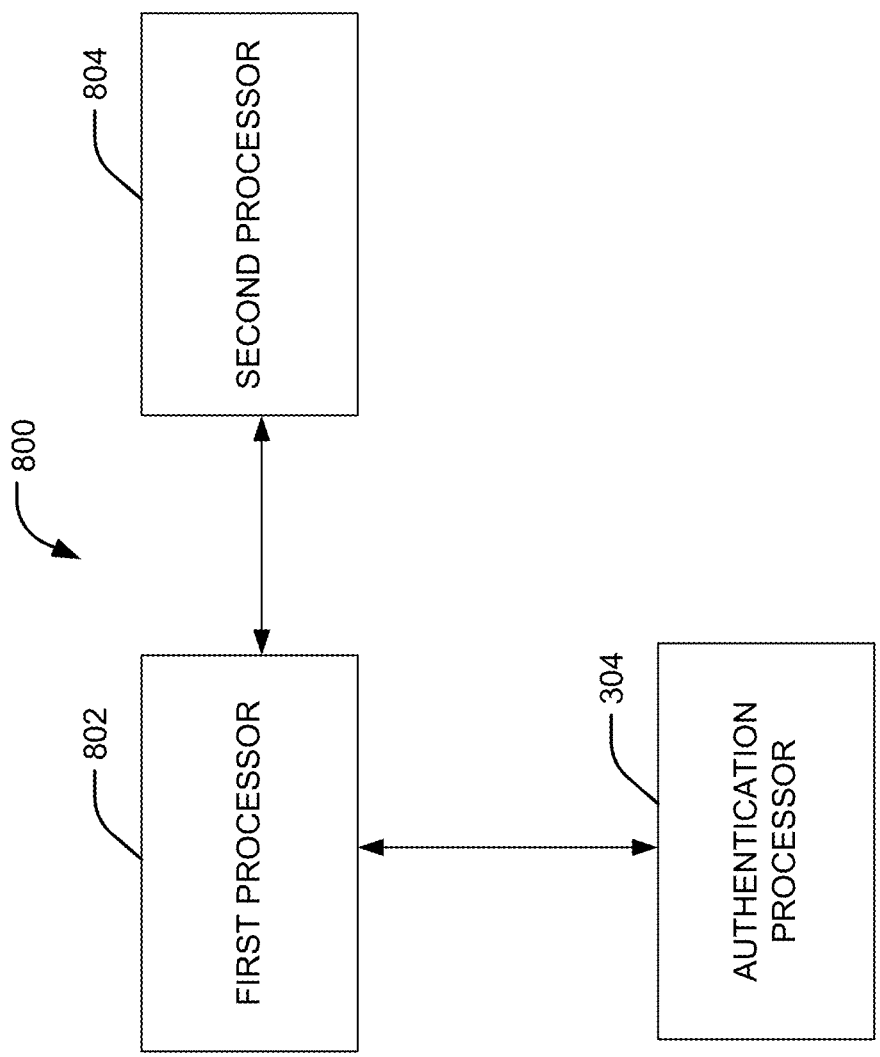
FIG. 8 is a block diagram illustrating an exemplary implementation of the system where the authentication processor is connected to only one processor, in accordance with an embodiment of the present disclosure.

FIG. 8 is a block diagram illustrating an exemplary implementation 800 of the system where the authentication processor 304 is connected to only one processor, in accordance with an embodiment of the present disclosure. As shown, the implementation 800 may include the authentication processor 304 connected to a first processor 802a which in turn is connected to a second processor 802b. The first processor 802a and the second processor 802b are executing at different devices such as the media devices 302a-n or the accessory devices 306a-n. For example, the first processor 802a may be executing at the accessory device 306c and the second processor 802d may be executing at the accessory device 306d. The accessory device 306c may directly interface with the authentication processor 304. Further, the accessory device 306c may include a proxy server module 610 for communicating with the authentication processor 304. The accessory device 306d may not interface with the authentication processor 304 directly but it can still use the one or more services of the authentication processor 304. The one or more services of the authentication processor 304 may include providing authentication service to the interconnected media devices 302*a-n* and the accessory devices 306*a-n*.

In an embodiment, the authentication processor 304 may connect to the first processor 802*a* through an I2C interface. Further, the first processor 802*a* may connect to the second processor 802*b* through an SPI interface. The second processor 802*b* may send a request to the first processor 802*a* for accessing the services of the authentication processor 304. The first processor 802*a* may establish a communication between the second processor 802*b* and the authentication processor 304.

Figure 9:
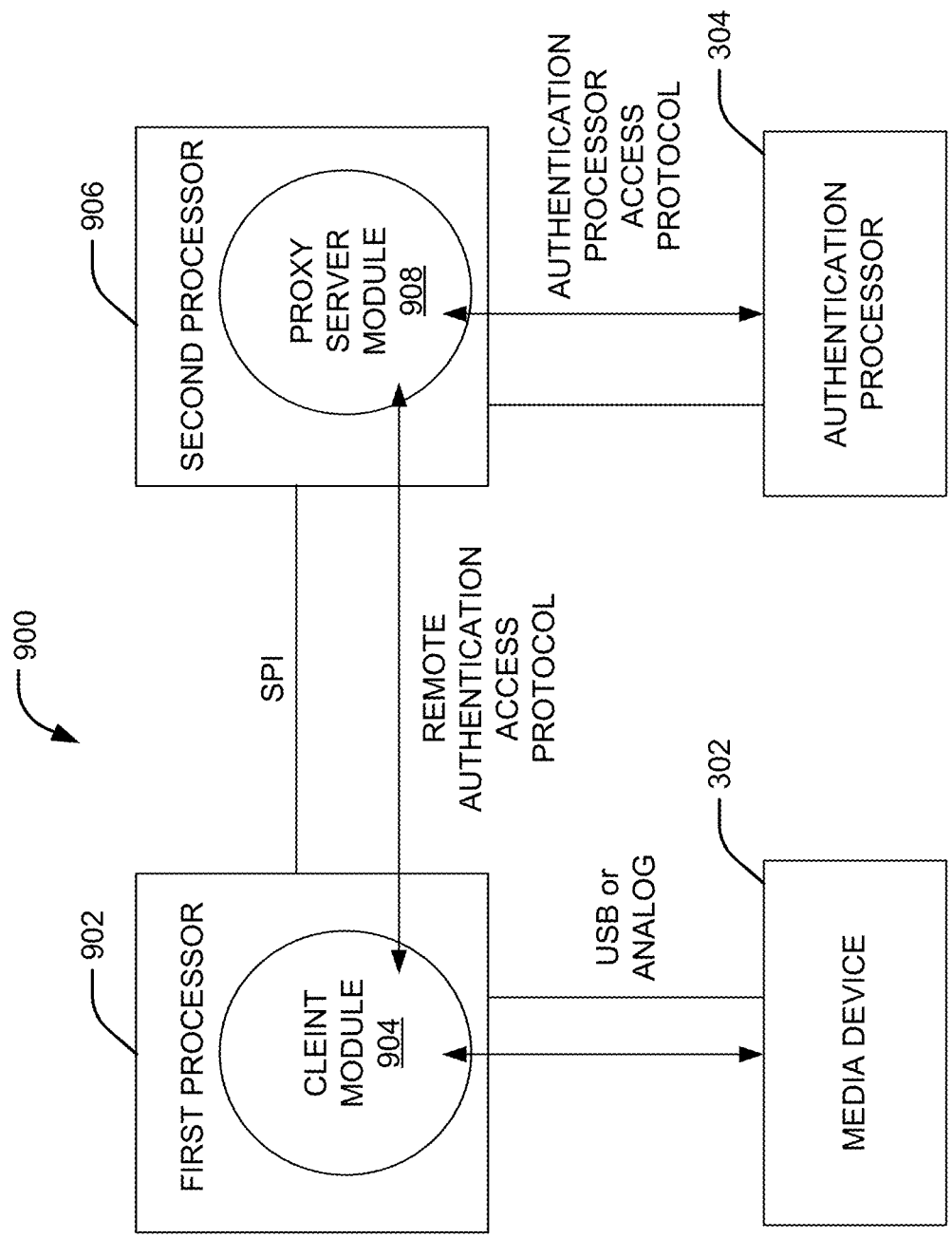
FIG. 9 is a block diagram illustrating an exemplary implementation of the system to extend the services of the authentication processor to multiple client modules.

FIG. 9 is a block diagram illustrating an exemplary implementation 900 of the system to extend the services of the authentication processor 304 to multiple client modules. As discussed with reference to FIGS. 6A and 6B, some of the accessory devices 306*a-n* may include a client module 608 and at least one of the accessory devices 306*a-n* may include the proxy server module 610. As shown in the implementation 900, the media device 302 may connect to a first processor 902 executing at an accessory device 306*a* of the accessory devices 306*a-n*. The media device 302 may connect to the first processor 902 via a USB or Analog interface. The first processor 902 may include a client module 904 for communicating with a proxy server module 908 executing at a second processor 906 of another accessory device 306*b* of the accessory devices 306*a-n*. The accessory device 306*b* may directly interface with the authentication processor 304.

The proxy server module 908 may communicate with the authentication processor 304 through an authentication access protocol such as an Apple Authentication Co Processor access protocol. Further, the proxy server module 908 may connect to the authentication processor 304 through an I2C interface. The first processor 902 may connect to the second processor 906 through an SPI interface. Further, the first processor 902 may communicate with the second processor 906 by using a remote authentication processor access protocol such as a remote Apple Authentication Co Processor (AACP) access protocol. The proxy server module 908 may extend the services of the authentication processor 304 to other processors of the other devices. Though the implementation 900 shows only two processors, but a person in the skilled art will appreciate that the implementation 900 may be extended to include more than two processors or devices. In an embodiment, the one or more devices or processors may be connected to each other via a switch, hub, bridge, and so forth. Further, the client module 904 executing at the same processor or on other processors may interface with the proxy server module 908 to access the services provided by the authentication processor 304. The client module 904 or the client module executing at other processors may communicate with the proxy server module 908 remotely. In an embodiment, other hardware interfaces such as, but not limited to, SPI interface or I2C interface may be used to interconnect the processors of various devices.

Exemplary Methods

Figure 10:
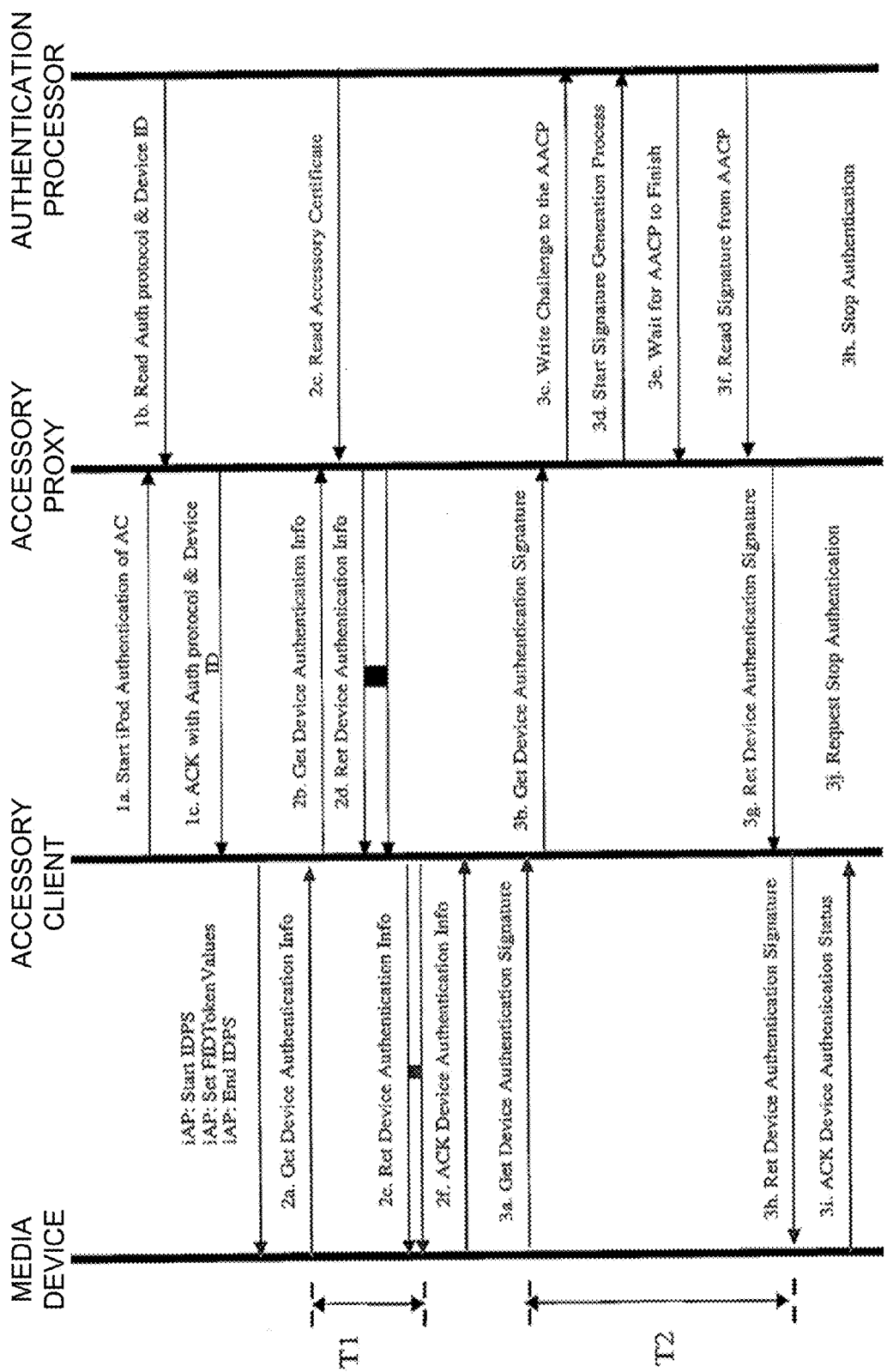
FIG. 10 is a diagram illustrating exemplary protocol interactions among various devices for authentication of an accessory device by a media device.

FIG. 10 is a diagram illustrating exemplary protocol interactions among various devices for authentication of an accessory device by a media device. As discussed with reference to FIG. 3, after attaching a media device to an accessory device, a client module executing at an accessory device may start authentication of the accessory device. The client module may send a request for authentication to a proxy server module executing at another accessory device. The proxy server module may in turn communicate with an authentication processor to authenticate the accessory device. The authentication processor may be attached to multiple devices. The authentication processor may read an authentication protocol and identity (ID) of the media device or the accessory device. Then the proxy server module may send an ACK message or acknowledgement along with the authentication protocol and the device ID to the media device via the client module. The client module then may receive the device authentication information from the media device and pass it to the authentication processor. The device authentication information may include a digital certificate such as an X.509 certificate or a challenge generated by the authentication processor. The authentication processor may read the accessory certificate (or digital certificate of the accessory device).

The client module may retrieve the device authentication information from the authentication processor via the proxy server module and send it to the media device. Further, the media device may send an ACK message or acknowledgment for the device authentication information back to the authentication processor. Thereafter, the media device may send a request to the authentication processor via the client module and the proxy server module for a digital signature. The proxy server module may write or send a challenge of the media device to the authentication processor. The authentication processor may start generating a digital signature in response to the challenge of the media device. Then the authentication processor may read the digital signature stored at the authentication processor. The authentication processor may send the digital signature to the media device via the client module and the proxy server module. Thereafter, the media device may send an ACK message or acknowledgement for device authentication status to the client module. The client module may request the authentication processor to stop the authentication process based on the device authentication status.

Figure 11:
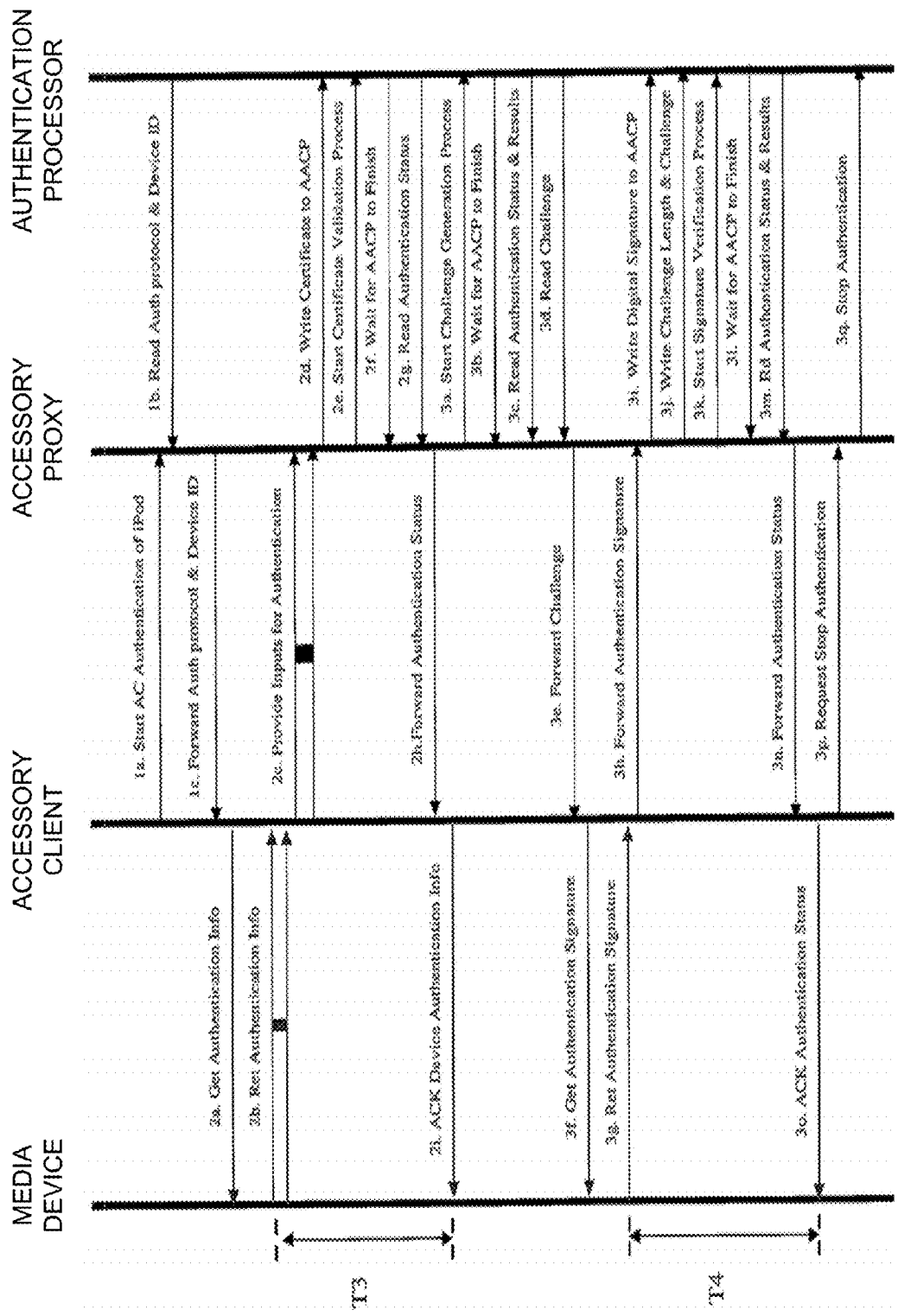
FIG. 11 is a diagram illustrating exemplary protocol interactions among various devices for authentication of a media device attached to the accessory device

FIG. 11 is a diagram illustrating exemplary protocol interactions among various devices for authentication of a media device attached to an accessory device. The media device may send a request to a client module executing at the attached accessory device. The client module may start the authentication process of the attached media device e.g. an iPod™. The authentication processor may read the authentication protocol and device ID from a proxy server module executing at a different accessory device. The proxy server module may interface and directly interact with the authentication processor. The authentication processor may be shared by a number of devices for authentication. The proxy server module may forward authentication protocol and device ID to the media device. The media device may receive a message for sending the authentication information to the authentication processor. The authentication information may be sent to the client module by the media device. The client module may also provide some inputs for the authentication. The proxy server module may write a digital certificate of the media device to the authentication processor. Thereafter, the authentication processor may send an authentication status to the media device via the intermediate accessory devices.

Thereafter, the authentication processor may start certificate validation process and finish the validation process. Further, the authentication processor may read authentication status and results. The authentication processor may read or generate a challenge for the media device and forward the challenge to the media device. Then, the media device may send a digital signature to the client module which in turn forwards it to the authentication processor. The authentication process may verify the digital signature provided by the media device and may generate an authentication status and result. The authentication status is then forwarded to the media device. The media device may in response send an ACK or acknowledgement message indicating successful receiving of the authentication status. Thereafter, the client module may send a request to stop the authentication process to the authentication processor. Finally, the authentication processor stops the authentication process. Thereafter, the communication between the authentication processor and media device may end.

Figure 12A:
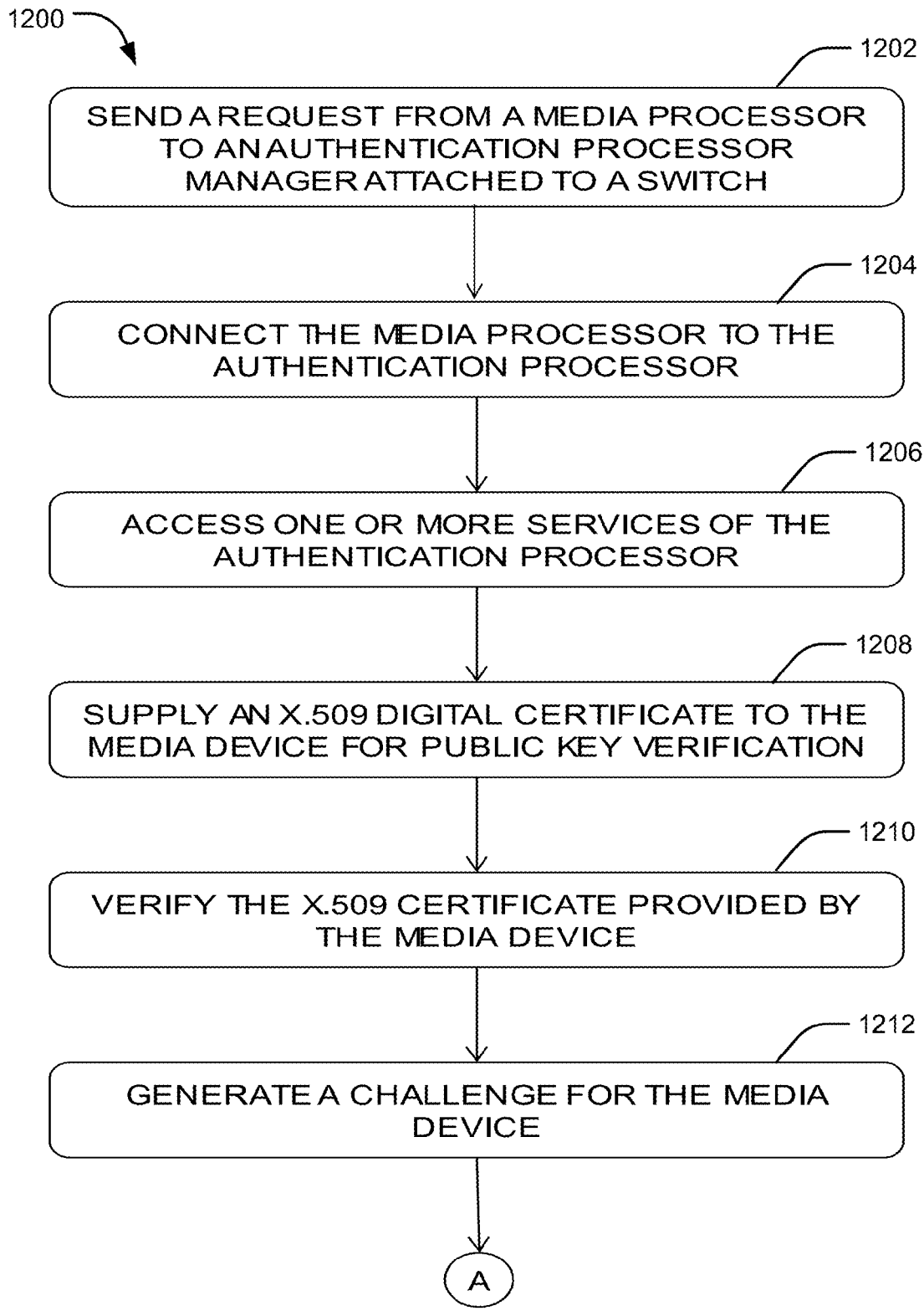
FIGS. 12A-B is a flowchart depicting an exemplary method for authenticating communication between a plurality of accessory devices or services and one or more media devices, in accordance with an embodiment of the present disclosure.
Figure 12B:
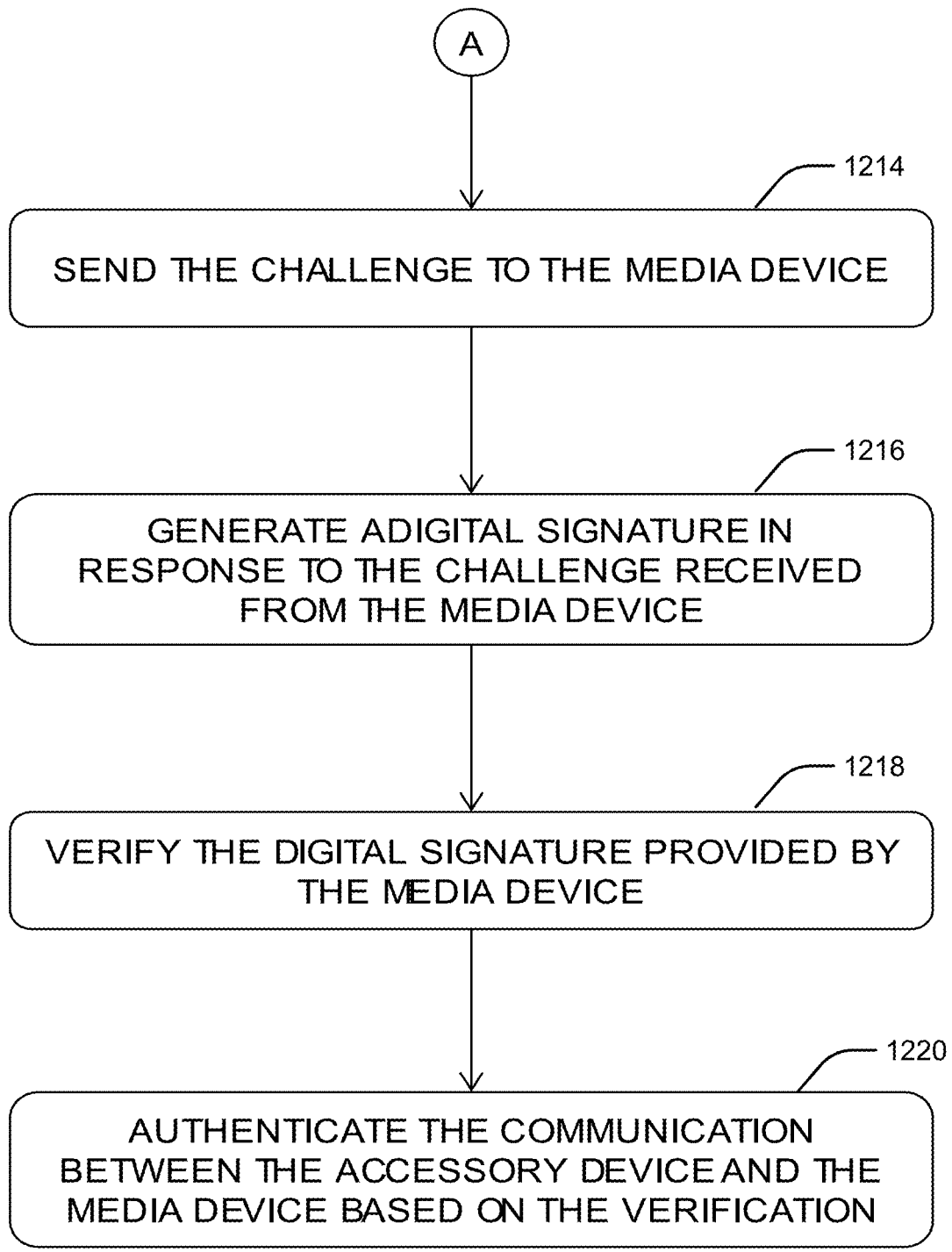

FIGS. 12A-B is a flowchart depicting an exemplary method for authenticating communication between a number of accessory devices or services and one or more media devices. The method 1200 illustrated in FIG. 12 may be used in conjunction with any of the systems or devices shown in the previously described figures, among other devices. In various embodiments, some of the method elements shown may be performed concurrently, in a different order than shown, or may be omitted. Additional method elements may be performed as desired. As shown, the method 1200 may operate as follows.

At step 1202, the media device 302 may send a request to an authentication processor manager attached to the switch 402. In an embodiment, the media processor 504 may send the request to the authentication processor manager 506. Next, at step 1204, the authentication processor manager 506 may connect the media processor 504 to the authentication processor 304. At step 1206, the media processor 504 may access one or more services of the authentication processor 304. The one or more services may include an authentication service.

At step 1208, the authentication processor 304 may supply an X.509 digital certificate to the media device for public key verification. Next at step 1210, the authentication processor 304 may verify the X.509 certificate provided by the media device 302. Then, at step 1212, the authentication processor 304 may generate a challenge for the media device 302. The challenge is then sent to the media device 302 by the authentication processor 304 at step 1214. At step 1216, the authentication processor 304 may generate a digital signature in response to the challenge received from the media device 302. Then, at step 1218, the authentication processor 304 may verify the digital signature provided by the media device 302. Thereafter, at step 1220, the authentication processor 304 may authenticate the communication between the accessory device 306 and the media device 302 based on the verification of the digital signature.

Figure 13A:
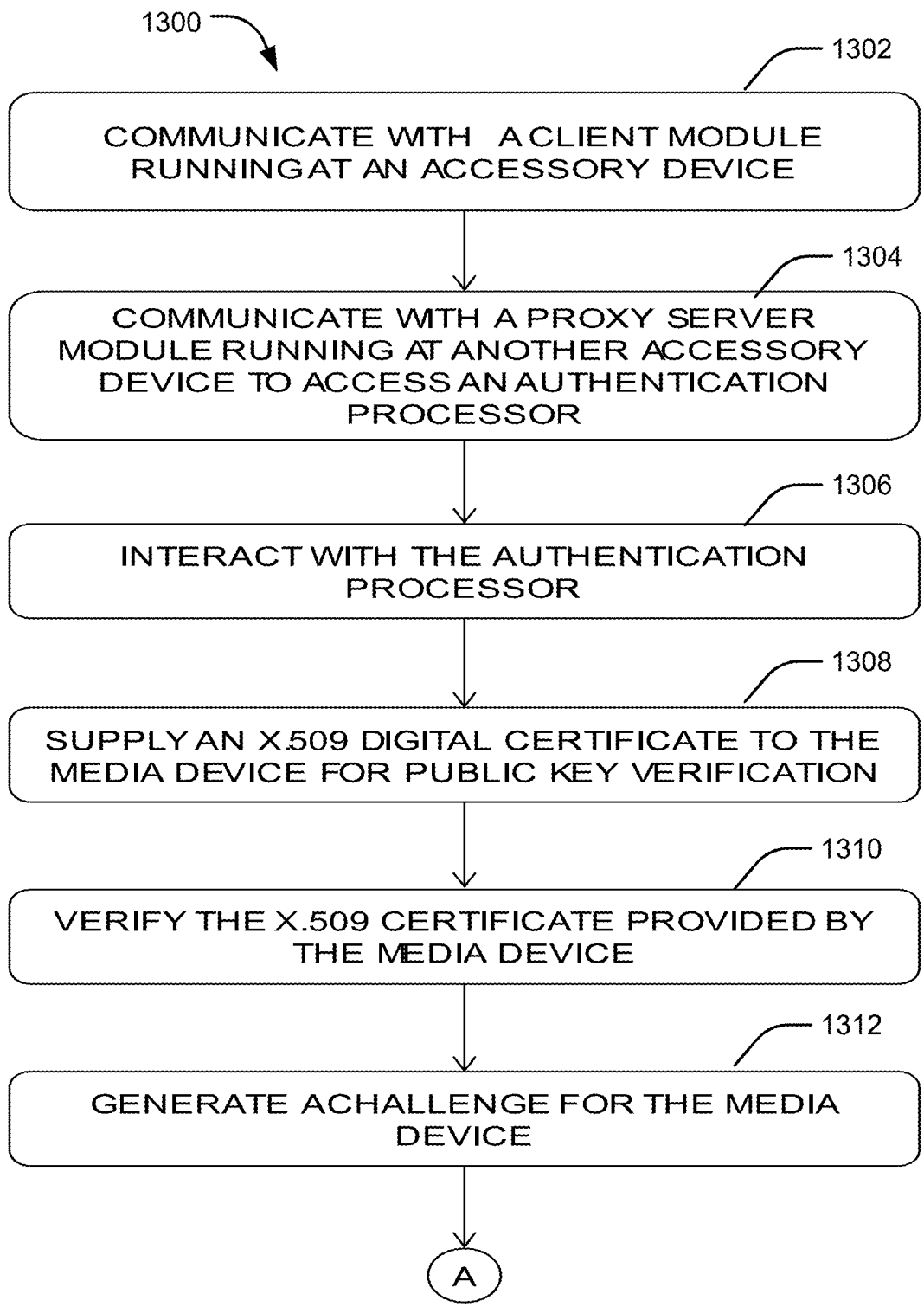
FIGS. 13A-B is a flowchart depicting an exemplary method for authenticating communication between a plurality of accessory devices or services and one or more media devices, in accordance with another embodiment of the present disclosure While embodiments of the present disclosure are amendable to various modifications and alternative forms, specific embodiments are shown by way of example in the drawings and are described in detail. It should be understood, however, that the drawings and detailed description thereto are not intended to limit the present disclosure to the particular form disclosed, but on the contrary, the intention is to cover all modifications, equivalents, and alternatives falling within the spirit and scope of the present disclosure as defined by the appended claims.
Figure 13B:
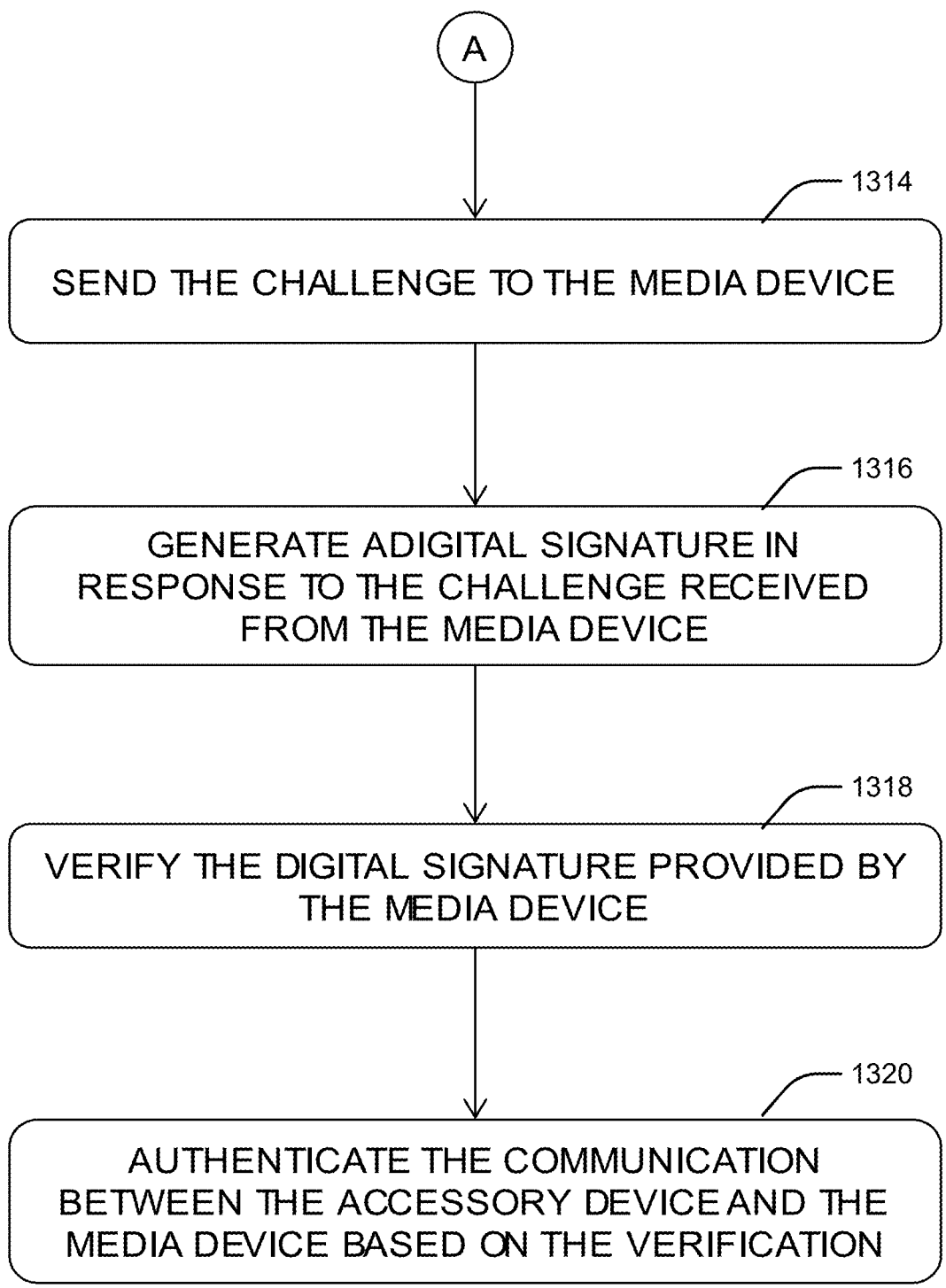

FIGS. 13A-B is a flowchart depicting an exemplary method for authenticating communication between a number of accessory devices or services and one or more media devices, in accordance with another embodiment of the present disclosure. The method 1300 illustrated in FIG. 13 may be used in conjunction with any of the systems or devices shown in the previously described figures, among other devices. In various embodiments, some of the method elements shown may be performed concurrently, in a different order than shown, or may be omitted. Additional method elements may be performed as desired. As shown, the method 1300 may operate as follows.

At step 1302, the media device 302 may communicate with a client module such as a client module 608 executing at an accessory device 306a. Then, at step 1304, the client module 608 may communicate with the proxy server module 610 executing at another accessory device 306b to access the authentication processor 304. At step 1306, the media device 302 may interact with the authentication processor 304. In an embodiment, the media device 304 may interact with the authentication processor 304 through the client module 608 and the proxy server module 610. Next, at step 1308, the authentication processor 304 may supply an X.509 digital certificate to the media device 302 for public key verification. At step 1310, the authentication processor 304 may verify the X.509 certificate provided by the media device 302. In an embodiment, the media device 302 may provide the X.509 certificate through the proxy server module 610. Then, at step 1312, the authentication processor 304 may generate a challenge for the media device 302. The challenge is then sent to the media device 302 by the authentication processor 304 at step 1314. The authentication processor 304 may generate a digital signature in response to the challenge received from the media device 302 at step 1316. Then, at step 1318, the authentication processor 304 may verify the digital signature provided by the media device 302. Thereafter, at step 1320, the authentication processor 304 may authenticate the communication between the accessory device 306 and the media device 302 based on the verification of the digital signature.

The methods and systems discussed in the present disclosure provide techniques to authenticate the media devices connected to the accessory devices by using a single authentication processor. Further, the authentication system may be extended easily for multiple media devices or accessory devices.

Those in the art will understand that the steps set out in the discussion above may be combined or altered in specific adaptations of the disclosure. The illustrated steps are set out to explain the embodiment shown, and it should be anticipated that ongoing technological development will change the manner in which particular functions are performed. These depictions do not limit the scope of the present disclosure, which is determined solely by reference to the appended claims.

What is claimed is:

1. A method for authenticating communication between a plurality of accessory devices or services and one or more media devices, the method comprising:
   configuring a switch to provide exclusive use of an authentication processor by a first media device of the one or more media devices, wherein the first media device is of a first media device type;
   receiving, at the authentication processor, a request from the first media device to authenticate a first accessory device;
   authenticating, by the authentication processor, the first accessory device on behalf of the first media device, wherein the authentication processor communicates with the first accessory device via a first microcontroller configured for interfacing with media devices of the first media device type;
   configuring the switch to release exclusive use of the authentication processor by the first media device;
   configuring the switch to provide exclusive use of the authentication processor by a second media device of the one or more media devices, wherein the second media device is of a second media device type;
   receiving, at the authentication processor, a request from the second media device to authenticate the first accessory device;
   authenticating, by the authentication processor, the first accessory device on behalf of the second media device, wherein the authentication processor communicates with the first accessory device via a second microcontroller configured for interfacing with media devices of the second media device type; and
   configuring the switch to release exclusive use of the authentication processor by the second media device.

2. The method of claim 1, wherein each of the plurality of accessory devices includes an accessory processor, and each of the media devices includes a media processor.

3. The method of claim 2, further comprising:
sending a request from a media processor executing at the media device to the authentication processor manager;
connecting the media processor with the authentication processor by means of an authentication processor manager; and
accessing one or more services of the authentication processor by the media processor.

4. The method of claim 2, wherein at least one of the plurality of accessory devices and the one or more media devices comprises a proxy server module, wherein the proxy server module provides services to one or more clients.

5. The method of claim 4, wherein one or more of the accessory devices and media devices includes a client module for interacting with the proxy server module to remotely access one or more services of the authentication processor.

6. The method of claim 5, wherein establishing the communication of the media device with the authentication processor further comprises:
communicating, by the media device, with the client module executing at an accessory device;
communicating, by the client module, with the proxy server module to access the authentication processor, wherein the proxy server module is executing at another accessory device; and
interacting, by the proxy server module, with the authentication processor.

7. The method of claim 1, wherein authenticating communications between the first accessory device and the first media device further comprises:
supplying, by the authentication processor, a digital certificate to the first media device for public key verification of the first accessory device; and
generating, by the authentication processor, a digital signature in response to a challenge from the first media device, wherein the digital signature is used by the authentication processor for authenticating communications between the first media device and the first accessory device.

8. The method of claim 7, wherein authenticating the communication further comprises:
verifying, by the authentication processor, a digital certificate provided by the first media device;
generating, by the authentication processor, a challenge for authenticating the first media device;
sending, by the authentication processor, the challenge to the first media device; and
verifying, by the authentication processor, the digital signature provided by the first media device in response to the challenge sent to the first media device; and
authenticating, by the authentication processor, communications between the first media device and the first accessory device based on the verification of the digital signature.

9. The method of claim 1, wherein the authentication is based on an X.509 digital certificate.

10. A system for authenticating communication between a plurality of accessory devices or services and one or more media devices, the system comprising:
an authentication processor configured to authenticate a first accessory device on behalf of a first media device of the one or more media devices and further configured to authenticate the first accessory device on behalf of a second media device of the one or more media devices;
a switch configured to provide exclusive use of the authentication processor by the first media device, wherein the first media device is of a first media device type and further configured to provide exclusive use of the authentication processor by a second media device of the one or more media devices, wherein the second media device is of a second media device type.

11. The system of claim 10, wherein the authentication processor is further configured to:
receive one or more request from a media processor executing at the media device to connect the media processor with the authentication processor;
enable the media processor to access one or more services of the authentication processor; and
ensure that only one processor is communicating with the authentication processor at a time.

12. The system of claim 10, wherein at least one of the plurality of accessory devices and the one or more media devices comprises a proxy server module, wherein the proxy server module provides services to one or more client modules.

13. The system of claim 12, wherein one or more of the plurality of processors comprises a client module for interacting with the proxy server module to remotely access one or more services of the authentication processor.

14. The system of claim 13, further comprising an authentication processor manager of an accessory device configured to:
communicate with the client module executing at an accessory device;
communicate with the proxy server module to access the authentication processor through the client module, wherein the proxy server module is executing at a processor of another accessory device; and
interact with the authentication processor through the proxy server module.

15. The system of claim 10, wherein the authentication processor is further configured to:
supply an X.509 digital certificate to the media device for public key verification; and generate a digital signature in response to a challenge from the attached media device,
wherein the digital signature is used for authenticating the communication.

16. The system of claim 15, wherein the authentication processor is further configured to:
verify the X.509 certificate provided by the media device;
generate a challenge for the media device;
send the challenge to the media device;
verify the digital signature provided by the media device in response to the challenge sent to the media device; and
authenticate the media device based on the verification of the digital signature.

17. The system of claim 10, wherein the authentication includes an X.509 digital certificate.

18. A system of claim 10, further comprising:
a proxy server module in communication with the authentication processor, and
wherein a client executes at each of the a plurality of processors for interacting with the proxy server module through a protocol for remotely accessing the services of the authentication processor.

19. The system of claim 18, wherein the plurality of processors are executing at one or more of a plurality of accessory devices and one or more media devices.

20. The system of claim 10, wherein the authentication processor communicates with the first accessory device via a first microcontroller configured for interfacing with media devices of the first media device type and wherein the authentication processor communicates with the first accessory device via a second microcontroller configured for interfacing with media devices of the second media device type.

* * * * *